United States Patent
Taniguchi

(10) Patent No.: US 8,254,560 B2
(45) Date of Patent: Aug. 28, 2012

(54) OSCILLATION-ECHO PREVENTING CIRCUIT AND MICROPHONE/SPEAKER UNIT

(75) Inventor: Yasutoshi Taniguchi, Fukuoka (JP)

(73) Assignee: School Juridical Person of Fukuoka Kogyo Daigaku, Fukuoka-shi (JP)

( * ) Notice: Subject to any disclaimer, the term of this patent is extended or adjusted under 35 U.S.C. 154(b) by 1580 days.

(21) Appl. No.: 11/660,691

(22) PCT Filed: Aug. 25, 2005

(86) PCT No.: PCT/JP2005/015445
§ 371 (c)(1), (2), (4) Date: Feb. 20, 2007

(87) PCT Pub. No.: WO2006/025256
PCT Pub. Date: Mar. 9, 2006

(65) Prior Publication Data
US 2008/0192944 A1    Aug. 14, 2008

(30) Foreign Application Priority Data
Sep. 1, 2004   (JP) ................................. 2004-254841

(51) Int. Cl.
*H04M 9/08* (2006.01)
(52) U.S. Cl. ......... 379/406.02; 379/406.08; 379/406.15; 370/282; 381/66; 381/93; 381/94.1; 381/94.3
(58) Field of Classification Search ................. 379/406.01–406.16; 381/66, 93, 381/94.1, 94.3; 370/282–286; 455/570
See application file for complete search history.

(56) References Cited

U.S. PATENT DOCUMENTS

| | | | | |
|---|---|---|---|---|
| 6,415,034 | B1 * | 7/2002 | Hietanen | 381/71.6 |
| 6,714,654 | B2 * | 3/2004 | Lichtblau | 381/317 |
| 6,728,385 | B2 * | 4/2004 | Kvaløy et al. | 381/328 |

FOREIGN PATENT DOCUMENTS

| | | |
|---|---|---|
| JP | 2001-075590 | 3/2001 |
| JP | 2001-077908 | 3/2001 |
| JP | 2001-189989 | 7/2001 |
| JP | 2003-124849 | 4/2003 |
| JP | 2003-249996 | 9/2003 |
| JP | 2003-264889 | 9/2003 |
| JP | 2004-120717 | 4/2004 |

* cited by examiner

Primary Examiner — Yuwen Pan
Assistant Examiner — Ibraham Sharifzada
(74) Attorney, Agent, or Firm — Flynn, Thiel, Boutell & Tanis, P.C.

(57) ABSTRACT

An oscillation-echo preventing circuit has a microphone/speaker unit and a voltage-canceling circuit for canceling voltages of audio receive signals. The microphone/speaker unit has a main body, at least two microphones, and a speaker or an earphone. The microphone seals a first inside space from an outside space. The microphone seals the first inside space from a second inside space. The speaker or the earphone seals the first inside space from the outside space. The voltage-canceling circuit cancels out the voltages of audio receive signals coming from the microphones, respectively, generating an output of minimum magnitude. Thus, the circuit can sufficiently suppress oscillation and echoing.

5 Claims, 6 Drawing Sheets

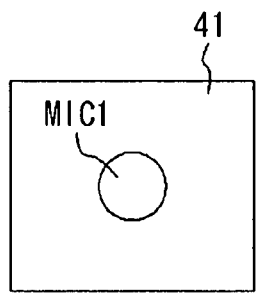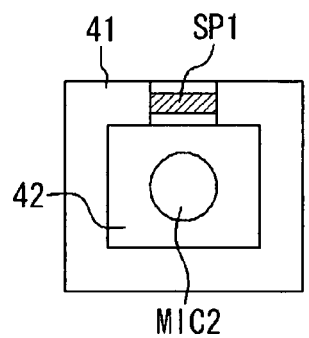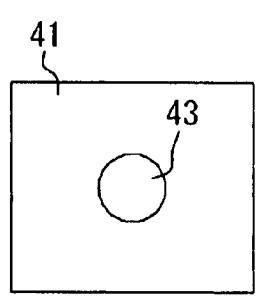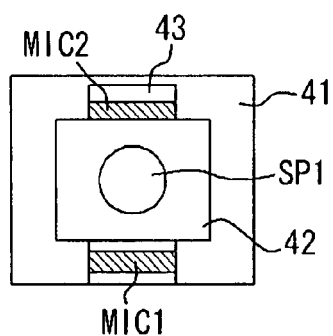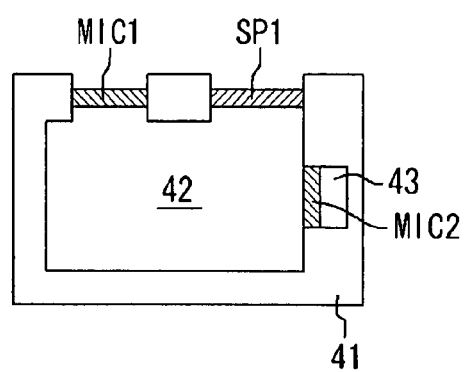

200074.)

OSCILLATION-ECHO PREVENTING CIRCUIT AND MICROPHONE/SPEAKER UNIT

TECHNICAL FIELD

The present invention relates to an oscillation-echo preventing circuit and a microphone/speaker unit, both for use in two-way communication equipments such as cellular telephones or in one-way communication apparatuses such as hearing aids. The circuit and the microphone/speaker unit can be used in various communication equipments, including mobile communication equipments such as cellular telephones and PHSs, ordinary telephones, earphone-microphone units, translation devices, speakers for aurally or orally handicapped persons or persons having damaged vocal cords, communication equipments for tour guides, communication equipments for announcers, communication equipments for train conductors, headset for operators, and hearing aids.

BACKGROUND ART

Hitherto known as communication equipments are wired or wireless mobile equipments such as cellular phones and PHSs. A communication system has been proposed, in which any mobile equipment can perform two-way communication with the fixed telephone linked to it or with any other communication equipments, through a telephone network including telephone radio relay units installed by NTT DoCoMo. Inc. or the like. (See, for example, Jpn. Pat. Appln. Laid-Open Publication No. 2002-300074.)

In the case of the two-way communication described above, however, a loop is formed due to the electrical coupling, including sound waves that propagate in the space between the transmitting unit and receiving unit of each communication equipments. Consequently, oscillation or echoing may develop in some cases. The oscillation occurs when the loop gain of the electrical coupling is 1 or more. The echoing takes place when the loop gain of the electrical coupling is 1 or less. Therefore, the transmitting unit and the receiving unit cannot be integrated or combined. In practice, these units can hardly be positioned close to each other. This makes a great problem to the noise reduction, miniaturization, weight reduction, manufacturing-cost reduction, and the like of the communication equipments, no matter whether the equipment is wired or wireless.

In view of the foregoing, an object of the present invention is to provide an oscillation-echo preventing circuit and a microphone/speaker unit, which can solve the problem with the conventional system, can suppress not only oscillation but also echoing in two-way communication equipments and one-way communication equipments, thereby to ensure a stable communication.

DISCLOSURE OF INVENTION

To achieve the above-mentioned object, an oscillation-echo preventing circuit according to the present invention is designed for use in two-way communication equipments such as cellular telephones or one-way communication equipments such as hearing aids. The circuit comprises a microphone/speaker unit and a voltage-canceling circuit for canceling voltages of audio receive signals. The microphone/speaker unit has a main body having at least two inside spaces filled with fluid such as air, at least two microphones arranged in the main body and sealing the first inside space from an outside space and sealing the first inside space from the second inside space, and a speaker or an earphone sealing the first inside space and the outside space from each other. The microphones are configured to detect, at the same time, the vibration of the fluid, caused by an audio receive signal in the first inside space, and the vibration of the fluid, caused by an audio transmit signal, such as sound, coming from the outside space. The speaker or earphone is configured to apply sound into the first inside space and the outside space at the same time. The voltage-canceling circuit is configured to cancel the voltages of the audio receive signals coming from the microphones, thereby to generate an output of minimum magnitude.

So configured, the oscillation-echo preventing circuit can effectively suppress oscillation and echoing that occur in two-way communication equipments and one-way communication equipments. If the circuit is used in a two-way communication equipment, the transmitting unit and the receiving unit can be arranged at the same position or close to each other, because oscillation and echoing can be suppressed. The transmitting unit and the receiving unit need not be spaced apart in order to prevent oscillation or echoing. Not is it necessary to perform a complex digital process in order to prevent echoing. The circuit may be epoch-making because it can achieve stable oral communication that accompanies no degradation of sound quality. Simple in configuration, the circuit can be manufactured at a relatively low cost. In addition, the circuit can be small and light.

BRIEF DESCRIPTION OF DRAWINGS

FIG. 3 is sectional views of the microphone/speaker unit, as viewed from various angles;

FIG. 3A is a sectional view that is taken along line IIIA-IIIA shown in FIG. 2;

FIG. 3B is a sectional view that is taken along line IIIB-IIIB shown in FIG. 2;

FIG. 3C is a sectional view that is taken along line IIIC-IIIC shown in FIG. 2;

FIG. 3D is a sectional view that is taken along line IIID-IIID shown in FIG. 2;

FIG. 4 is a sectional view showing a modification of the microphone/speaker unit;

BEST WAY FOR CARRYING OUT THE INVENTION

Embodiments of the present invention will be described, with reference to the accompanying drawings.

First Embodiment

Figure 1:
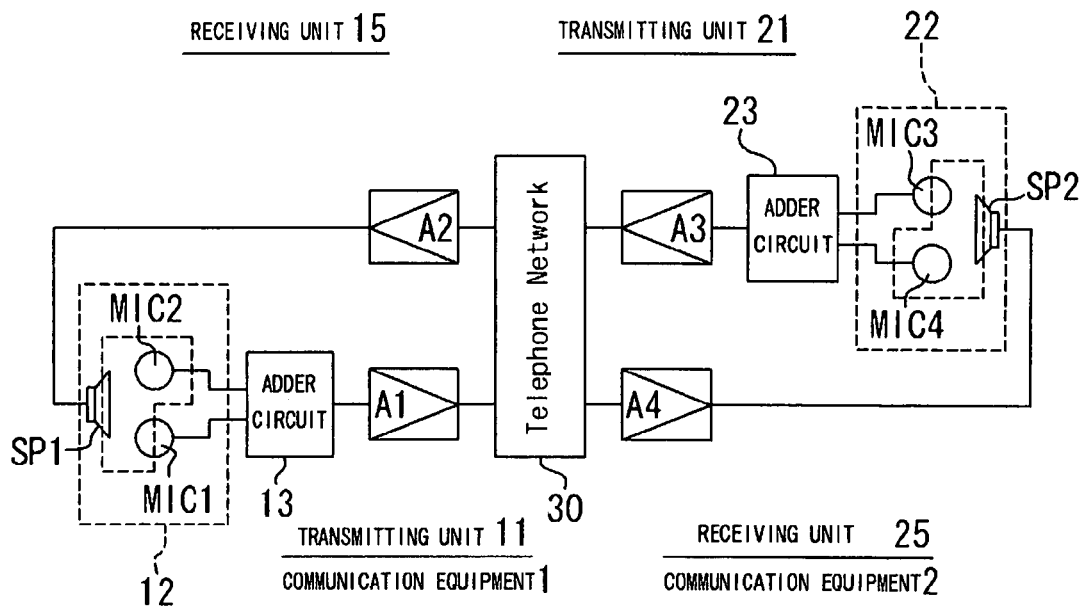
FIG. 1 is a circuit block diagram of an oscillation-echo preventing circuit, which is the first embodiment of this invention and which is incorporated in a radio communication equipment capable of performing two-way communication.

The first embodiment is applied to a radio communication equipment (for example, a cellular telephone) that can perform two-way communication. FIG. 1 is a circuit block diagram of an oscillation-echo preventing circuit that is incorporated in a cellular telephone. In FIG. 1, the components that need not be explained, such as the battery, are not shown.

The transmitting unit 11 of a communication equipment 1 comprises microphones MIC1 and MIC2 and an adder circuit 13, and an amplifier circuit A1. The microphones MIC1 and MIC2 constitute a microphone/speaker unit 12. The adder circuit 13 is used as a voltage-canceling circuit for canceling voltage of audio receive signals. The receiving unit 15 of the communication equipment 1 comprises an amplifier circuit A2 and a speaker SP1. The speaker SP1 constitutes a microphone/speaker unit 12. The transmitting unit 21 of a communication equipment 2 comprises microphones MIC3 and MIC4 and an adder circuit 23, and an amplifier circuit A3. The microphones MIC3 and MIC4 constitute a microphone/speaker unit 22. The adder circuit 23 is used as a voltage-canceling circuit for canceling voltage of audio receive signals. The receiving unit 25 of the communication equipment 2 comprises an amplifier circuit A4 and a speaker SP2. The speaker SP2 constitutes a microphone/speaker unit 22. Reference number 30 designates a telephone network that connects the communication equipments 1 and 2.

The microphone/speaker units 12 and 22 are identical in configuration. Therefore, only the microphone/speaker unit 12 will be described with reference to FIGS. 2 and 3. The microphone/speaker unit 12 has a box-shaped hollow main body 41 made of synthetic resin. The main body 41 defines a large inside space 42 and a small inside space 43, which are closed and sealed. Each space is filled with fluid such as air. The microphone MIC1 is arranged on the main body 41, partitioning the first inside space 42 from the outside space 44. The microphone MIC2 is arranged on the main body 41, partitioning the first inside space 42 and the second inside space 43 from each other. The microphones MIC1 and MIC2 can detect, at the same time, the vibration of the fluid in the first inside space 42, caused by the sound that the speaker SP1 generates from an audio receive signal, and the vibration of the fluid, caused by the sound generated from an audio transmit signal, such as sound, coming from the outside space 44. The speaker SP1 is provided on the main body 41, partitioning the first inside space 42 and the outside space 44 from each other, and can therefore apply sound into the first inside space 42 and the outside space 44 at the same time.

Figure 2:
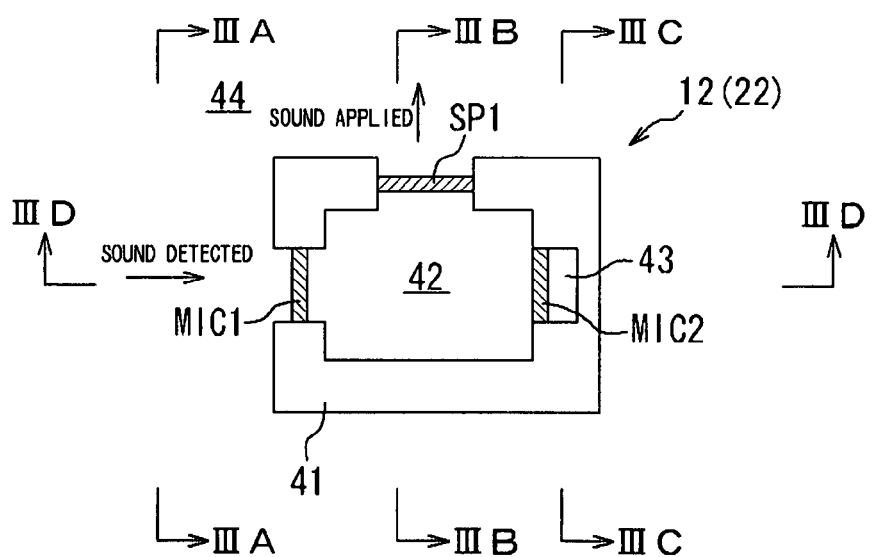
FIG. 2 is a sectional view of the microphone/speaker unit for use in the oscillation-echo preventing circuit.
Figure 5:
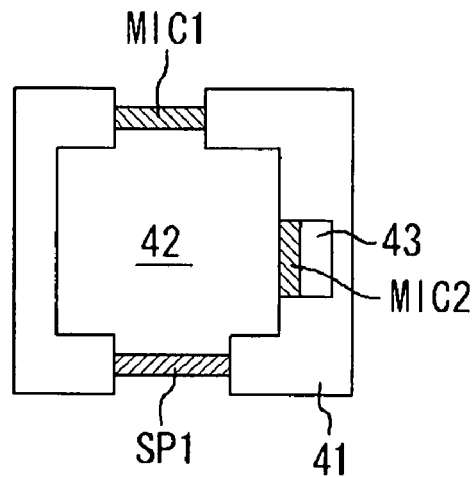
FIG. 5 is a sectional view showing another modification of the microphone/speaker unit.
Figure 6:
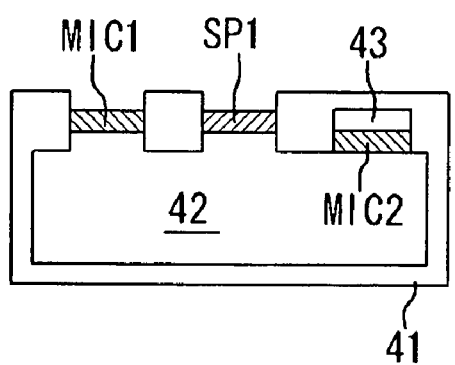
FIG. 6 is a sectional view showing still another modification of the microphone/speaker unit.
Figure 7:
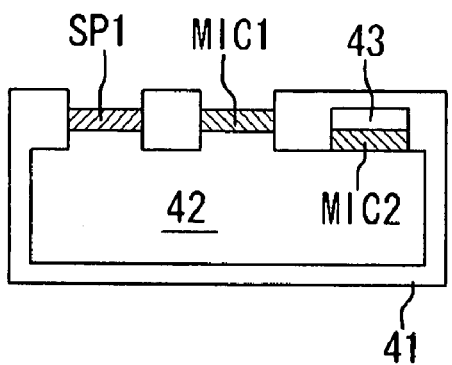
FIG. 7 is a sectional view showing a further modification of the microphone/speaker unit.

The arrangement of the microphones MIC1 and MIC2 and the speaker SP1 and the shapes and sizes thereof, and sizes of the inside spaces 42 and 43 or the like, which are provided in the microphone/speaker unit 12, are not limited to those illustrated in FIG. 2. Other configurations are, of course, possible. Some modifications will be described with reference to FIG. 4 et seq. As shown in FIG. 4, the microphone MIC1 may be arranged in the same direction as the speaker SP1. As shown in FIG. 5, the microphone MIC1 may be opposed to the speaker SP1. As shown in FIGS. 6 and 7, the microphone MIC2 may be arranged in the same direction as the microphone MIC1 and the speaker SP1. Further, as shown in FIGS. 7 and 6, the microphone MIC1 and the speaker SP1 are switched in position. Any one of the microphone/speaker units exemplified here can be utilized.

Figure 8:
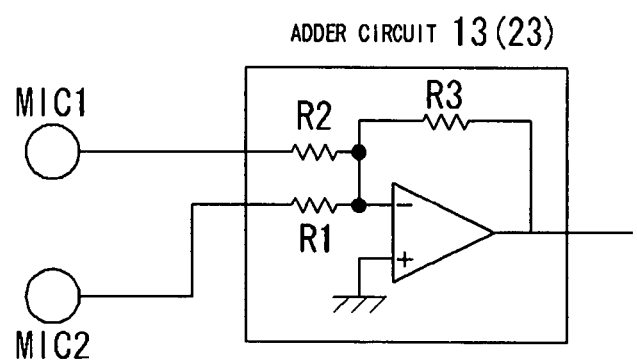
FIG. 8 is a diagram illustrating an adder circuit.

The adder circuits 13 and 23 are identical in configuration. Hence, only the adder circuit 13 will be described with reference to FIG. 8. As FIG. 8 shows, the adder circuit 13 comprises resistors R1, R2 and R3. The circuit 13 changes the polarities of the outputs of the microphones MIC1 and MIC2, thereby canceling out the voltage of an audio receive signal. That is, the circuit 13 is adjusted to add the voltages of input signals so that the resulting sum may be minimal when the microphones MIC1 and MIC2 detect the vibration of fluid in the first inside space 42, such as air, caused by the audio receive signal output from the speaker SP1. The circuit 13 is adjusted, also to add the voltages of the input signals so that only that component of an audio transmit signal from the outside space may fully remain when the microphones MIC1 and MIC2 detect the vibration of fluid caused by the audio transmit signal, such as sound, coming from the outside space 44, not from the inside space 42. The difference between the outputs of the microphones MIC1 and MIC2 is controlled by adjusting the values of the resistors R1 and R2, thereby to minimize the output voltage of the adder circuit 13.

The amplifier circuit A2 amplifies the audio receive signal supplied from the communication equipment 2 through the telephone network 30. The signal amplified is output from the speaker SP1 of the microphone/speaker unit 12 into the outside space 44 and the first inside space 42. The microphones MIC1 and MIC2 of the microphone/speaker unit 12 detect the signal output from the speaker SP1. As indicated above, the adder circuit 13 is adjusted to cancel out the voltages of the audio receive signals from the two microphones MIC1 and MIC2 so that the resulting sum may become minimal. Therefore, the adder circuit 13 will not output the audio receive signals.

Since no audio receive signals are output, the amplifier circuit A1 provided in the transmitting unit 11 performs amplification. Thus, signals are transmitted to the communication equipment 2 via the telephone network 30. Nonetheless, no audio receive signals are supplied.

The audio receive signal output to the speaker SP1 are converted to sound, which propagates into the outside space 44, too. Therefore, the user can hear the sound generated from the audio receive signal.

The microphone MIC 1, which opens to the outside space 44 of the microphone/speaker unit 12, catches the audio transmit signal that the communication equipment 1 is to transmit to the communication equipment 2 through the telephone network 30. At this time, the microphone MIC2 cannot catch sound at all. Hence, an audio transmit signal, such as sound, never ceases to exist even if the adder circuit 13 cancels out the voltages of the audio receive signals the two microphones MIC1 and MIC 2 have generated.

The amplifier circuit A1 amplifies the audio transmit signal. The signal amplified can be transmitted to the communication equipment 2 through the telephone network 30.

The signals received, such as sound, are collected in the first inside space 42 of the microphone/speaker unit 12. The audio receive signals have no phase difference, because the external influence is suppressed. The adder circuit 13 cancels out the voltages of these, signals, and a signal is transmitted to the communication equipment 2. Therefore, neither oscillation nor echoing takes place between the communication equipments 1 and 2. Oscillation and echoing can be prevented in the same way in the communication equipment 2, too. If the oscillation-echo preventing circuit is incorporated in both communication equipments 1 and 2, better results will be obtained.

In the first embodiment, the adder circuits 13 and 23 cancel out the voltages of the audio receive signals. This is nothing more than a preferred example. Other circuits that perform similar operations may be used.

Second Embodiment

Figure 9:
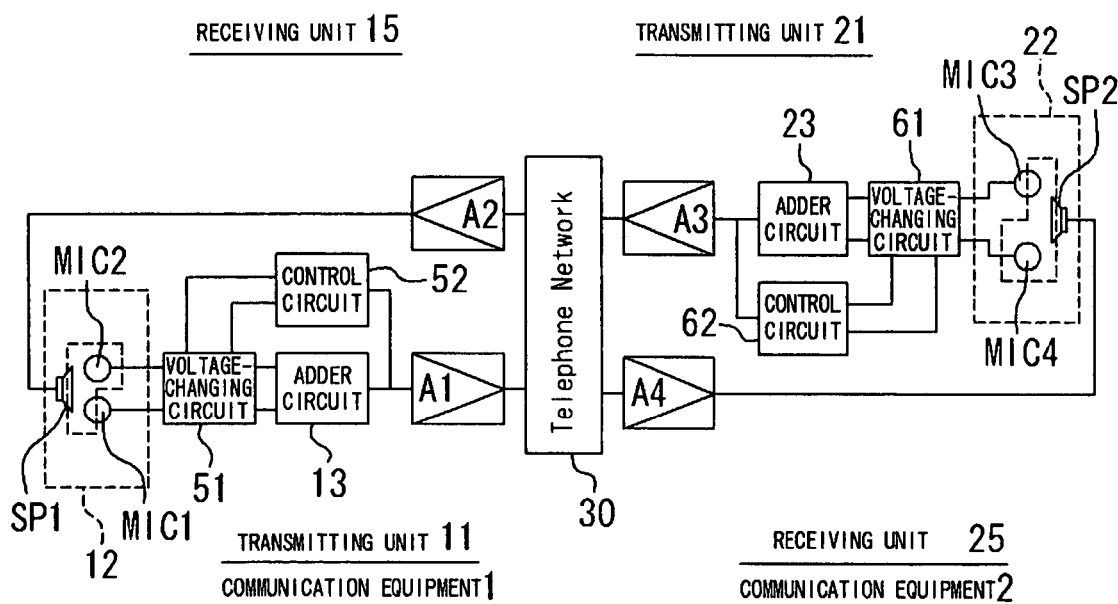
FIG. 9 is a circuit block diagram of an echo preventing circuit that is the second embodiment.
Figure 10:
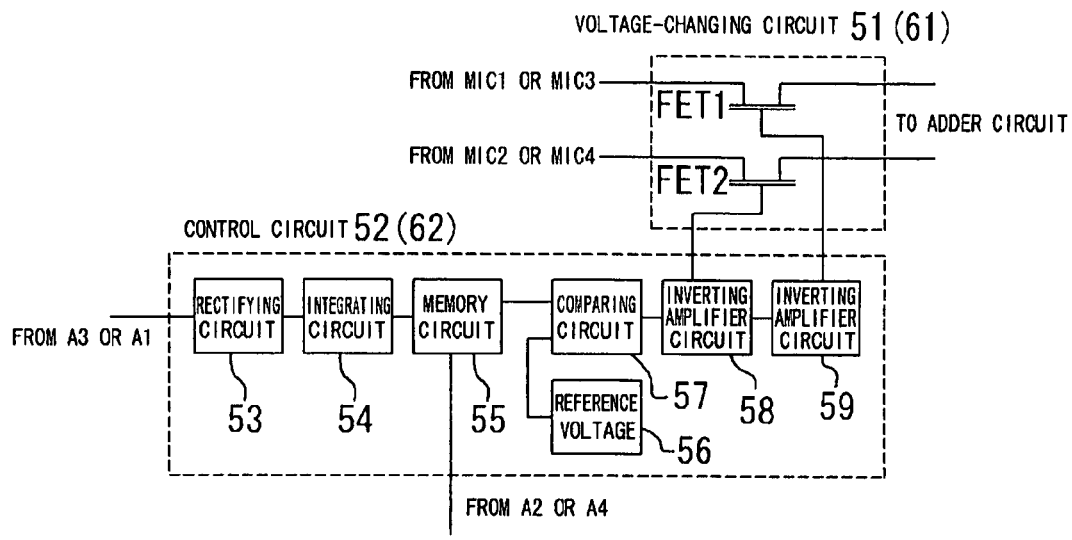
FIG. 10 is a circuit block diagram showing a voltage-changing circuit and a control circuit.

FIGS. 9 and 10 show the second embodiment. In the first embodiment, the two microphones MIC1 and MIC2 of the microphone/speaker unit 12 detect an output of the speaker SP1, and the two microphones MIC3 and MIC4 of the microphone/speaker unit 22 detect an output of the speaker SP2. The adder circuit 13 must cancel out the voltages of the two signals generated by the microphones MIC1 and MIC2 to generate a signal of minimum magnitude. Similarly, the adder circuit 23 must cancel out the voltages of the two signals generated by the microphones MIC3 and MIC4 to generate a signal of minimum magnitude. The adder circuits 13 and 23 may not fully cancel out the voltages of two signals, because the speakers (SP1, etc.) and microphones (MIC1, MIC2, etc.), i.e., the components of the microphone/speaker units 12 and 22, undergo temperature change and aging in changing environment. In this case, control circuits that automatically adjust the fluctuation may be used. FIGS. 9 and 10 show the embodiment that has such control circuits.

More precisely, the second embodiment has voltage-changing circuits 51 and 61, control circuits 52 and 62. The circuits 52 and 62 comprise field-effect transistors FET1 and FET2 each. The circuit 51 is provided between the microphones MIC1 and MIC2 and distributes signal voltages electronically. The circuit 61 is provided between the microphones MIC3 and MIC4 and distributes signal voltages electronically. The control circuit 52 is provided between the output of the adder circuit 13 and the voltage-changing circuit 51 and controls the voltage-changing circuit 51. The control circuit 62 is provided between the output of the adder circuit 23 and the voltage-changing circuit 61 and controls the voltage-changing circuit 61.

The control circuit 52 and 62 are similar in configuration. As shown in FIG. 10, the control circuit 52, or one of the control circuits, comprises a rectifying circuit 53, an integrating circuit 54, a memory circuit 55, a comparing circuit 57, and inverting amplifier circuits 58 and 59. The rectifying circuit 53 is connected to receive a part of the audio receive signal coming from the adder circuit 13 and converts the voltage of the audio receive signal to a ripple current. The integrating circuit 54 is connected to the rectifying circuit and generates a voltage of the direct-current signal. The memory circuit 55 is connected to the integrating circuit and stores the data representing the voltage of the direct-current signal only if this voltage contains an audio receive signal. The comparing circuit 57 is connected to the memory circuit 55 and compares the output voltage of the memory circuit 55 with a reference voltage 56. The inverting amplifier circuits 58 and 59 are connected to the comparing circuit 57 and output a control signal to the voltage-changing circuit 51. The control signal causes the circuit 51 to output a signal that reduces the output of one microphone if the output of the other microphone is large, and increases the output of one microphone if the output of the other microphone is small.

The second embodiment can operate in the same way as the first embodiment. In addition, the voltage-changing circuit 51 and 61 and the control circuits 52 and 62 cooperate, automatically adjusting the voltages of the audio receive signals if these voltages are not minimized due to the fluctuation that takes place as the speakers (SP1, etc.) and microphones (MIC1, MIC2, etc.), i.e., the components of the microphone/speaker units 12 and 22, undergo temperature change and aging in changing environment.

The microphone/speaker units 12 and 22, which are shown in FIG. 2 to FIG. 7, comprise one speaker SP1 and two microphones MIC1 and MIC2 each. The speaker SP1 and the microphones MIC1 and MIC2 are provided in the main body 41 and sealed from outside. FIGS. 2 to 7 schematically show the basic structure the main body 41 may have to perform its function. The main body 41 may have any structure so long as it provides a space, such as the first inside space 42 sealed from the outside space 44 by the speaker SP1 and the microphone MIC1, and a space, such as the second inside space 43 sealed from the outside space 44 by the microphone MIC2.

In the microphone/speaker units 12 and 22, the inside spaces 42 and 43 are closed, and fluid such as air does not flow from one space into the other. Nevertheless, the spaces 42 and 43 need not be perfectly closed spaces as long as the vibration of the vibration membrane of the speaker SP1, is fully transmitted to the vibration membranes of the microphones MIC1 and MIC2 and the sum of the noises in the outputs of the microphones, obtained by the adder circuits 13 and 23, is therefore negligibly small. In the first inside space 42 and the second inside space 43, fluid such as air flows. Instead, any other fluid, such as nitrogen or carbon dioxide, may flow in these spaces. The voltage-changing circuits 51 and 61 comprise field-effect transistors FET1 and FET2 each and adjust the voltages of signals. They may have any other configuration only if they can adjust the voltages of signals.

Third Embodiment

Figure 11:
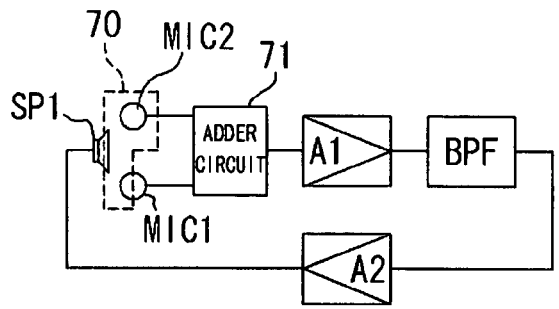
FIG. 11 is a circuit block diagram of the oscillation-echo preventing circuit incorporated in a radio communication equipment which is the third embodiment and which can perform one-way communication.

The third embodiment is applied to a communication equipment (e.g., a hearing aid) that can perform one-way communication. FIG. 11 is a circuit block diagram of the oscillation-echo preventing circuit incorporated in the hearing aid. The components, such as the battery, which drive the circuit and which need not be explained, are not shown in this figure.

The hearing aid comprises microphones MIC1 and MIC2, a speaker SP1, an adder circuit 71, an amplifier circuit A1, a band-pass filter BPF, and an amplifier circuit A2. The microphones MIC1 and MIC2 constitute a microphone/speaker unit 70. The adder circuit 71 is used as a circuit for extracting an audio receive signal from the speaker SP1.

Figure 12:
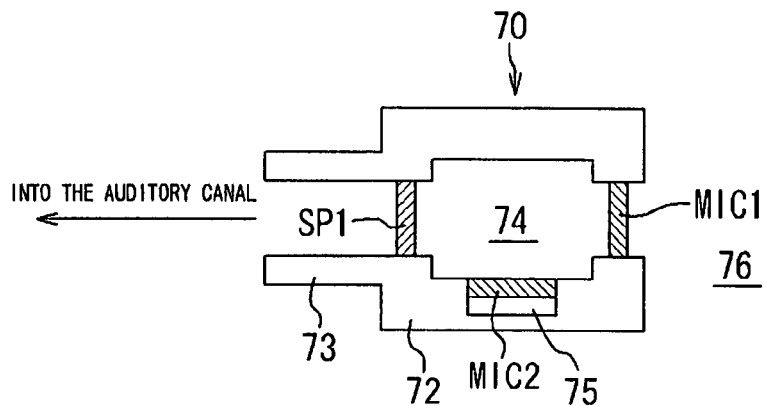
FIG. 12 is a sectional view of the microphone/speaker unit used in the oscillation-echo preventing circuit.

FIG. 12 shows the microphone/speaker unit 70. The microphone/speaker unit 70 has a main body 72 made of synthetic resin and shaped like a hollow box. A small cylindrical part 73 is integrally formed with the main body 72 and located at the speaker SP1. The cylindrical part 73 can be inserted into the auditory canal. The main body 72 has two closed inside spaces, i.e., large space 74 and small space 75. The spaces 74 and 75 are filled with fluid such as air. In the main body 72, the microphone MIC1 is arranged, sealing the first inside space 74 from the outside space 76, and the microphone MIC2 is arranged, sealing the first inside space 74 and the second inside space 75 from each other. The microphones MIC1 and MIC2 can detect, at the same time, the vibration of the fluid in the first inside space 74, caused by the sound that the speaker SP1 generates from an audio receive signal, and the vibration of the fluid, caused by the sound generated from an audio transmit signal, such as sound, coming from the outside space 76. The speaker SP1 is provided on the main body 72, partitioning the first inside space 74 and the outside space 76 from each other, and can therefore apply sound into the first inside space 74 and the outside space 76 (i.e., the auditory canal) at the same time.

In the microphone/speaker unit 70, the arrangement of the microphones MIC1 and MIC2 and the speaker SP1 and the shapes and sizes thereof, and sizes of the inside spaces 74 and 75 or the like are not limited to those illustrated, just as in the microphone/speaker unit 12. The inside spaces 74 and 75 may have any size and configurations other than those shown. Further, as in the microphone/speaker unit 12, the inside spaces 74 and 75 may be filled with any other fluid if the same effect is attained. Moreover, the spaces 74 and 75 may not be closed. The adder circuit 71 has the same configuration and performs the same function, as the adder circuit 13.

The band-pass filter BPF is used to stabilize the operation of the oscillation-echo preventing circuit. Whether to use the band-pass filter BPF may be determined in accordance with the frequency band for the audio signals. The band-pass filter BPF can be dispensed with. It need not be used if the hearing aid stably operates.

In the hearing aid configured as described above, the microphone MIC1 detects an audio signal transmitted from the outside space 76. The signal is amplified as it passes through the adder circuit 71, band-pass filter BPF and amplifier circuit A2. From the signal the speaker SP1 generates, sound, which is applied into the auditory canal, i.e., outside space 76, and into the first inside space 74. In the first inside space 74, the microphones MIC1 and MIC2 catch the sound and generate signals. The adder circuit 71 generates a signal of sufficiently small magnitude. Hence, oscillation and echoing do not occur or can be effectively suppressed.

Fourth Embodiment

Figure 13:
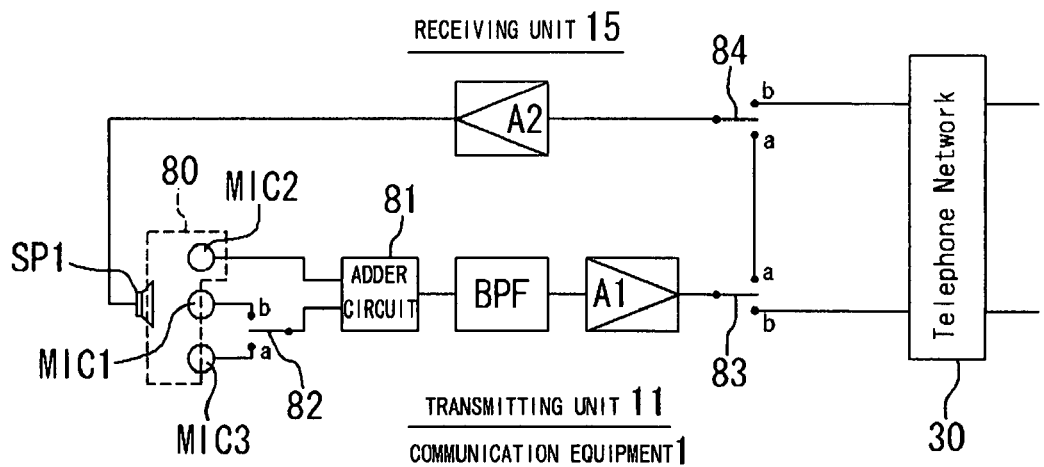
FIG. 13 is a circuit block diagram of the oscillation-echo preventing circuit incorporated in a radio communication equipment which is the fourth embodiment, which can operate as a hearing aid as well and which can perform two-way communication.

The fourth embodiment is applied to a communication equipment (e.g., cellular telephone) that can perform two-way communication and function as a hearing aid, as well. FIG. 13 is a circuit block diagram of a hearing aid/cellular telephone equipment, that incorporates an oscillation-echo preventing circuit and a microphone/speaker unit. The components, such as the battery, which drive the circuit and which need not be explained, are not shown in this figure.

The hearing aid/cellular telephone equipment comprises microphones MIC1, MIC2 and MIC3, a speaker SP1, an adder circuit 81, a band-pass filter BPF, an amplifier circuit A1, changeover switches 82, 83 and 84, and an amplifier circuit A2. The microphones MIC1, MIC2 and MIC 3 and the speaker SP1 constitute a microphone/speaker unit 80. The adder circuit 81 functions as a circuit for canceling the voltage of audio receive signals coming from the speaker SP1. The changeover switches 82, 83 and 84 are operated to achieve switching between the hearing aid and the cellular telephone. The changeover switch 84, amplifier circuit A2 and speaker SP1 constitute the receiving unit 15 of the cellular telephone. The other components constitute the transmitting unit 11.

Figure 14:
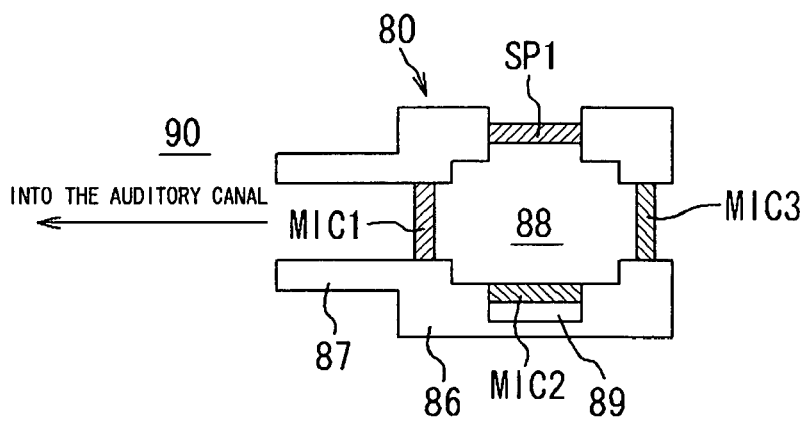
FIG. 14 is a sectional view of the microphone/speaker unit used in an oscillation-echo preventing circuit.

FIG. 14 shows an example of the microphone/speaker unit 80 incorporated in the hearing aid/cellular telephone equipment. The microphone/speaker unit 80 has a main body 86 made of synthetic resin and shaped like a hollow box. A small cylindrical part 87 is integrally formed with the main body 86 and located at the microphone MIC1. The cylindrical part 87 can be inserted into the auditory canal. The main body 86 has two closed inside spaces, i.e., large space 88 and small space 89. The spaces 88 and 89 are filled with fluid such as air. In the main body 86, the microphone MIC1 is arranged, sealing the first inside space 88 from the outside space 90 (i.e., the auditory canal), and the microphone MIC3 is arranged, sealing the first inside space 88 and the outside space 90 from each other. The microphone MIC2 is arranged, sealing the first inside space 88 and the second inside space 89 from each other. The microphones MIC1, MIC2 and MIC 3 can detect, at the same time, the vibration of the fluid in the first inside space 88, caused by the sound that the speaker SP1 generates from an audio receive signal, and the vibration of the fluid, caused by the sound generated from an audio transmit signal, such as sound, coming from the outside space 90. The speaker SP1 is provided on the main body 86, partitioning the first inside space 88 and the outside space 90 from each other, and can therefore apply sound into the first inside space 88 and the outside space 90 at the same time.

In the microphone/speaker unit 80, the arrangement of the microphones MIC1, MIC2 and MIC3 and the speaker SP1 and the shapes and sizes thereof, and sizes of the inside spaces 88 and 89 or the like are not limited to those illustrated, just as in the microphone/speaker unit 12. Other configurations are possible. Further, as in the microphone/speaker unit 12, the inside spaces 88 and 89 may be filled with any other fluid if the same effect is attained. Moreover, the spaces 88 and 89 may not be closed.

Figure 15:
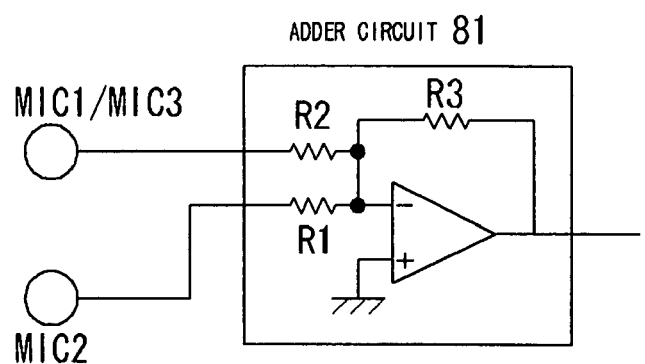
FIG. 15 is a diagram showing the adder circuit used in an oscillation-echo preventing circuit.

As FIG. 15 shows, the adder circuit 81 comprises resistors R1, R2 and R3 and the like. It alters the polarities of the outputs from the microphone MIC1 and MIC2 or the outputs from the microphones MIC2 and MIC3, thereby canceling out the outputs. That is, the adder circuit 81 has been adjusted to operate as follows. First, it adds the received audio signals that the microphones MIC1 and MIC2 or microphones MIC2 and MIC3 generate from the vibration of fluid (e.g., air) caused by the audio receive signals output from the speaker SP1 and applied into the first inside space 88, such that the sum of the voltages of the received audio signals become minimal. Second, the adder circuit 81 adds the outputs such that the sum of the voltages of the received signals maintains only the audio signal component. Note that the sum is generated when the microphones MIC1 and MIC2 or the microphones MIC2 and MIC3 detect the vibration of the fluid such as air, caused by the audio receive signal, such as sound, coming from the space 90 outside the first inside space 88. The difference between the outputs of the microphones MIC1 and MIC2 or between the outputs of the microphones MIC2 and MIC3 is minimized by imparting the same characteristic to the microphones MIC1 and MIC3, by connecting a resistor (not shown) in parallel to the microphones MIC1 and MIC3 or by adjusting the values of the resistors R1 and R2.

In the hearing aid/cellular telephone equipment so configured as described above, the hearing aid and the cellular telephone are switched from one when the user operates the changeover switches 82, 83 and 84. The hearing aid becomes operative when the switches 82, 83 and 84 are switched to contact a shown in FIG. 13. The cellular telephone becomes operative when the switches 82, 83 and 84 are switched to contact b shown in FIG. 13.

To use the hearing aid/cellular telephone equipment as a hearing aid, the user connects the switches 82, 83 and 84 to the contact a. The microphone MIC3 of the microphone/speaker unit 80 is thereby connected to the adder circuit 81, and the microphones MIC2 and MIC3 perform a haring-aid function. That is, the microphone MIC 3 receives an audio transmit signal, such as sound, from the outside space 90. The audio signal received is supplied via the adder circuit 81 to the band-pass filter BPF, which removes unnecessary frequency components from the signal. The amplifier circuits A1 and A4 amplify the signal. The signal thus amplified is supplied to the speaker SP1. The speaker SP1 generates an amplified sound. The user can therefore hear the sound. The receive signal coming from the speaker SP1 is input, at the same time, to the microphones MIC2 and MIC3. Nonetheless, the oscillation and echoing are effectively suppressed, because the adder circuit 81 has fully canceled out the outputs from the microphones MIC2 and MIC3.

To use the hearing aid/cellular telephone equipment as a cellular telephone, the user connects the switches 82, 83 and 84 to the contact b. In this case, the microphone MIC1 of the microphone/speaker unit 80 is thereby connected to the adder circuit 81, and the microphones MIC1 and MIC2 perform a cellular-phone function. That is, the microphones MIC1 and MIC2 receive an audio receive signal from the telephone network 30 through the amplifier circuit A2 and the speaker SP1. The audio receive signal is input to the microphones MIC1 and MIC2 at the same time. Nonetheless, they are sufficiently canceled out in the adder circuit 81 and will not be transmitted to the person at the other end of the line. In addition, the oscillation and echoing are effectively suppressed. The microphone MIC1 indeed detects an audio transmit signal such as sound. However, the microphone MIC2 does not detect this signal. As a result, the audio transmit signal passes through the adder circuit 18, not canceled out at all. The band-pass filter BPF removes unnecessary frequency components from the audio transmit signal. The amplifier circuits A1 amplifies the signal, which is supplied via the telephone network 30 to the person at the other end of the line.

In the embodiments described above, the receiving unit 15 or 25 has the speakers SP1 and SP2. They may have an earphone, in addition to the speakers. In reducing the present invention to practice, various design changes can be made within the scope defined by the claims appended hereto.

The invention claimed is:

1. An oscillation-echo preventing circuit for use in two-way communication equipment or in one-way communication apparatuses, said circuit comprising:
   a microphone/speaker unit including:
      a main body having at least two inside spaces filled with a fluid,
      at least two microphones arranged in the main body and sealing the first inside space from an outside space and from the second inside space, and
      a speaker or an earphone sealing the first inside space and the outside space from each other;
   a voltage-canceling circuit for canceling voltages of audio receive signals;
   a voltage-changing circuit for distributing the voltages of audio signals received from the microphones; and
   a control circuit for controlling the voltage-changing circuit and including:
      a rectifying circuit connected to receive a part of the audio receive signal coming from the voltage-canceling circuit and to convert the voltage of the audio receive signal to a ripple current,
      an integrating circuit connected to the rectifying circuit and configured to generate a direct-current signal,
      a memory circuit connected to the integrating circuit and configured to store data representing the voltage of the direct-current signal only when the voltage contains the audio receive signal and no audio transmit signal,
      a comparing circuit connected to the memory circuit and configured to compare the output voltage of the memory circuit with a reference voltage, and
      inverting amplifier circuits connected to the comparing circuit and configured to output a control signal to the voltage-changing circuit, causing one microphone to generate a large output when the other microphone outputs a small output, and to generate a small output when the other microphone generates a large output,
   wherein the microphones are configured to detect, at the same time, the vibration of the fluid, caused by an audio receive signal in the first inside space, and the vibration of the fluid, caused by an audio transmit signal coming from the outside space,
   the speaker or earphone is configured to apply sound into the first inside space and the outside space at the same time,
   the voltage-canceling circuit is configured to cancel the voltages of the audio receive signals coming from the microphones, thereby generating an output of minimum magnitude,
   the sum of the voltages of the received audio signals automatically becomes minimal when the sum of the received audio signals is not fully minimal at the time of detecting the vibration of the fluid, caused by the audio receive signals in the first inside space, because the components of the voltage-canceling circuit undergo temperature change and aging in changing environment.

2. The oscillation-echo preventing circuit according to claim 1, wherein the first inside space and the second inside space are closed spaces that are filled with the fluid.

3. The oscillation-echo preventing circuit according to claim 1, wherein the voltage-canceling circuit is an adder circuit that adds received audio signals generated when the microphones detect the vibration of the fluid, caused by the audio receive signals in the first inside space, such that the sum of the voltages of the received audio signals becomes minimal.

4. The oscillation-echo preventing circuit according to claim 1, wherein the voltage-canceling circuit is an adder circuit that adds received audio signals such that the sum of the voltages of the received audio signals fully maintains only the component of an audio transmit signal coming from the outside space, when the microphones detect the vibration of the fluid, caused by the audio transmit signal.

5. The oscillation-echo preventing circuit according to claim 1, wherein the voltage-canceling circuit is an adder circuit that adds received audio signals generated when the microphones detect the vibration of the fluid, caused by the audio receive signals in the first inside space, such that the sum of the voltages of the received audio signals becomes minimal, and adds received audio signals such that the sum of the voltages of the received audio signals fully maintains only the component of an audio transmit signal coming from the outside space, when the microphones detect the vibration of the fluid caused by the audio transmit signal coming from the outside space, not from the first inside space.

* * * * *